(12) United States Patent
Kang

(10) Patent No.: US 12,298,905 B2
(45) Date of Patent: May 13, 2025

(54) STORAGE DEVICE FOR CACHING DATA SEGMENT IN HASH-BASED DATA SEGMENT CACHE AND OPERATING METHOD OF THE STORAGE DEVICE

(71) Applicant: SK hynix Inc., Icheon (KR)

(72) Inventor: Hye Mi Kang, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 18/352,870

(22) Filed: Jul. 14, 2023

(65) Prior Publication Data
US 2024/0330181 A1 Oct. 3, 2024

(30) Foreign Application Priority Data
Mar. 28, 2023 (KR) .................. 10-2023-0040327

(51) Int. Cl.
G06F 12/08 (2016.01)
G06F 12/0802 (2016.01)
G06F 12/0864 (2016.01)

(52) U.S. Cl.
CPC ...... G06F 12/0802 (2013.01); G06F 12/0864 (2013.01)

(58) Field of Classification Search
CPC ............. G06F 12/0802; G06F 12/0864; G06F 12/1018

USPC ........................................................ 711/118
See application file for complete search history.

(56) References Cited

U.S. PATENT DOCUMENTS

| | | | |
|---|---|---|---|
| 2014/0281249 A1* | 9/2014 | Waldspurger | G06F 12/0802 711/136 |
| 2014/0310462 A1* | 10/2014 | Waldspurger | G06F 11/3476 711/118 |
| 2016/0103767 A1* | 4/2016 | Banerjee | G06F 3/067 711/118 |
| 2016/0291891 A1* | 10/2016 | Cheriton | G06F 3/064 |
| 2022/0283948 A1 | 9/2022 | Chofleming et al. | |

FOREIGN PATENT DOCUMENTS

KR 20160010580 A 1/2016

* cited by examiner

*Primary Examiner* — Than Nguyen

(57) ABSTRACT

A storage device may determine a target data segment from among a plurality of data segments, execute a hash function on the target data segment, and cache the target data segment in a data segment cache based on a result of executing the hash function on the target data segment. The data segment cache may be a hash table including N buckets each of which is able to cache one or more data segments. The hash function may be a function which outputs an index of the target bucket based on N, an index of the target data segment, and a seed value.

14 Claims, 11 Drawing Sheets

STORAGE DEVICE FOR CACHING DATA SEGMENT IN HASH-BASED DATA SEGMENT CACHE AND OPERATING METHOD OF THE STORAGE DEVICE

CROSS-REFERENCE TO RELATED APPLICATION

The present application claims priority under 35 U.S.C. 119(a) to Korean patent application number 10-2023-0040327 filed on Mar. 28, 2023, which is incorporated herein by reference in its entirety.

TECHNICAL FIELD

The embodiments of the present disclosure relate to a storage device for caching data segments in a hash-based data segment cache and an operating method of the storage device.

BACKGROUND

A storage device is a device for storing data based on a request from an external device such as a computer, a mobile terminal such as a smart phone or tablet, or various electronic devices.

The storage device may further include a controller for controlling memory (e.g. volatile memory/non-volatile memory). The controller may receive a command from an external device, and execute or control operations to read, write, or erase data in the memory included in the storage device based on the input command.

Meanwhile, a storage device may use a cache to more quickly process an operation of reading or writing data.

SUMMARY

Embodiments of the disclosure may provide a storage device and an operating method thereof capable of optimizing the time required to search for a data segment from a data segment cache.

In an aspect, embodiments of the disclosure may provide a storage device including i) a memory for storing a plurality of data segments, and ii) a controller configured to control a data segment cache capable of caching all or part of the plurality of data segments.

In this case, the data segment cache may be a hash table comprising N buckets (N is a natural number of 2 or more) each of which is able to cache one or more data segments. In addition, the controller may determine a target bucket, which is a bucket in which the target data segment is to be cached, among the N buckets based on a result of executing a hash function on a target data segment among the plurality of data segments, and may cache the target data segment in the target bucket.

In this case, the hash function may be a function for outputting an index of the target bucket based on the N, an index of the target data segment and a seed value.

In another aspect, embodiments of the disclosure may provide an operating method of a storage device including i) determining a target data segment from among a plurality of data segments, ii) executing a hash function on the target data segment, and iii) caching the target data segment in a data segment cache capable of caching all or part of the plurality of data segments based on a result of executing the hash function on the target data segment.

In this case, caching the target data segment in a data segment cache may include i) determining a target bucket, which is a bucket in which the target data segment is to be cached, among the N buckets (N is a natural number of 2 or more) based on the result of executing the hash function on the target data segment, and ii) caching the target data segment in the target bucket.

In this case, the hash function may a function for outputting an index of the target bucket based on the N, an index of the target data segment and a seed value.

According to the embodiments of the present disclosure, it is possible to optimize the time required to search for a data segment from a data segment cache.

DETAILED DESCRIPTION

Figure 1:
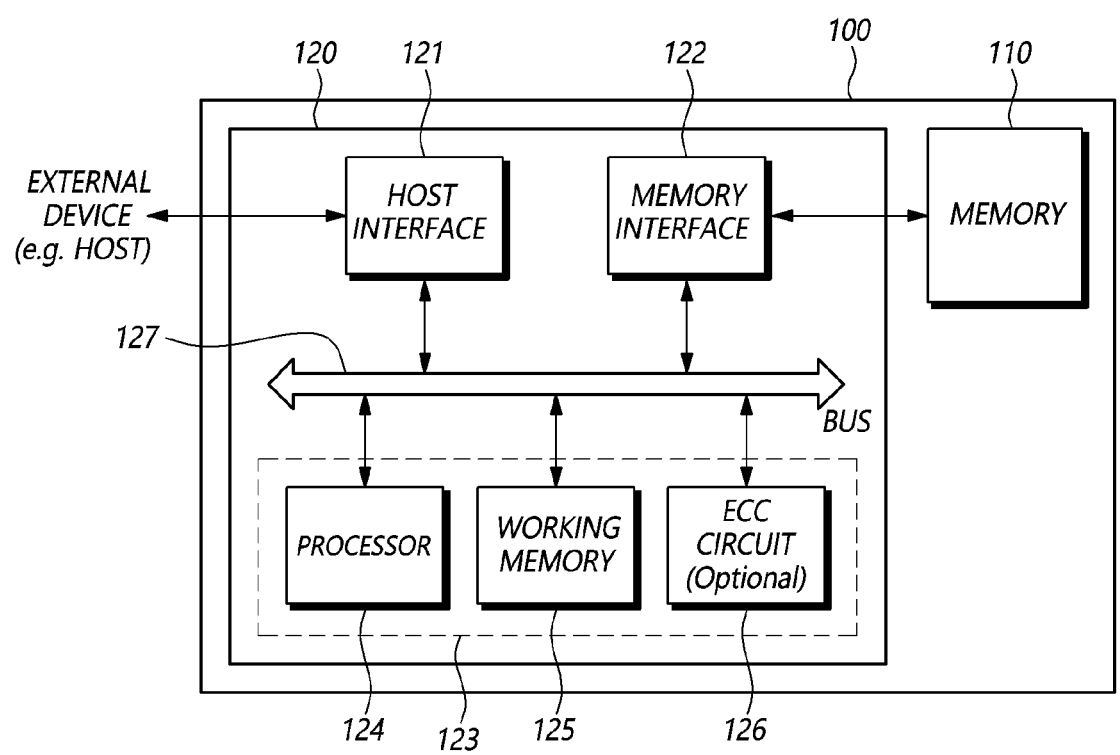
FIG. 1 is a schematic configuration diagram of a storage device according to an embodiment of the disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device according to an embodiment of the disclosure.

Referring to FIG. 1, a storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data. Such a memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 capable of storing data.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM).

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
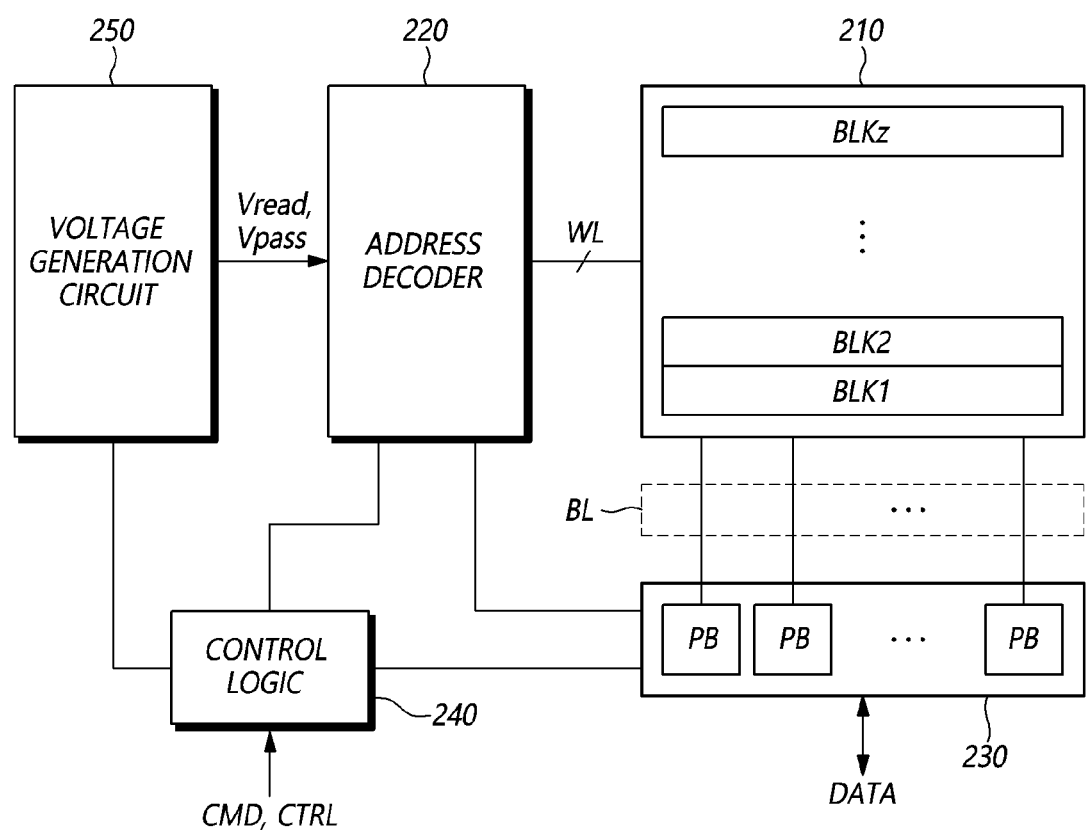
FIG. 2 is a block diagram schematically illustrating a memory of FIG. 1.

FIG. 2 is a block diagram schematically illustrating a memory of FIG. 1.

Referring to FIG. 2, a memory 110 according to an embodiment of the disclosure may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
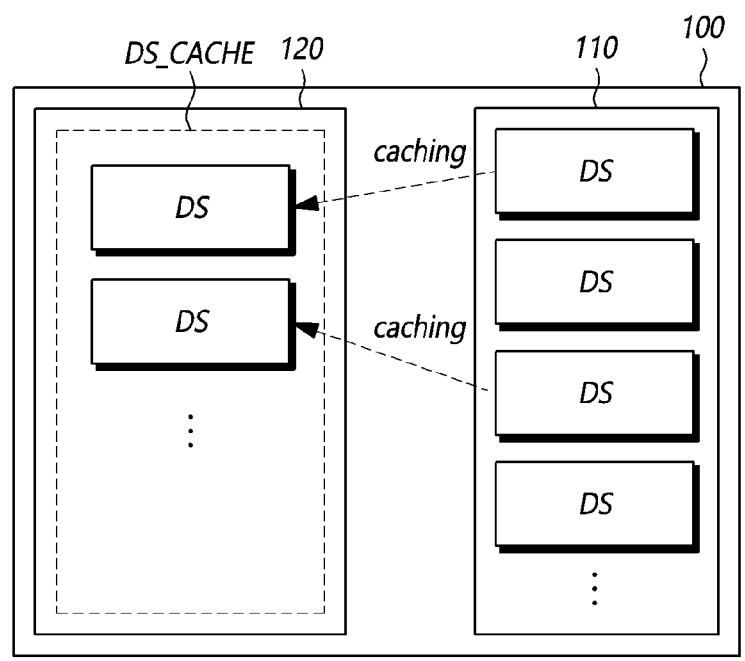
FIG. 3 illustrates a schematic structure of a storage device according to embodiments of the present disclosure.

FIG. 3 illustrates a schematic structure of a storage device 100 according to embodiments of the present disclosure.

Referring to FIG. 3, a storage device 100 may include a memory 110 and a controller 120.

The memory 110 may store a plurality of data segments DS. For example, the plurality of data segments DS may be data having the same size (e.g., 4 kilobytes (KB)).

Meanwhile, each of the plurality of data segments DS may be identified through an index corresponding to each data segment.

The controller 120 may control a data segment cache DS_CACHE. The data segment cache DS_CACHE may cache all or part of a plurality of data segments DS. The controller 120 may more quickly process an operation using the plurality of data segments DS by using the data segment cache DS_CACHE. For example, the data segment cache DS_CACHE may be located on the working memory 125 of the controller 120.

FIG. 3 discloses an example in which the data segment cache DS_CACHE is located inside the controller 120, however, the data segment cache DS_CACHE may be located in a separate volatile memory (e.g., SRAM, DRAM) located outside the controller 120.

The structure of the data segment cache DS_CACHE will be described below.

Figure 4:
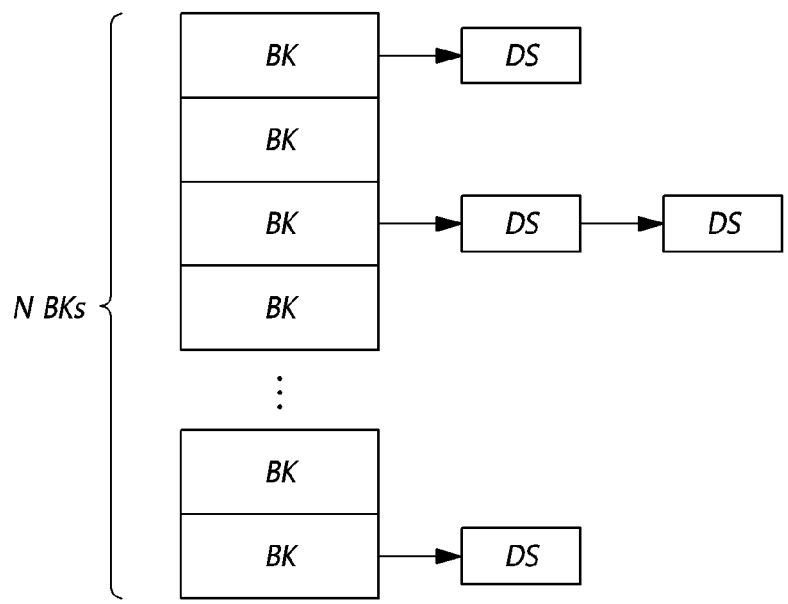
FIG. 4 illustrates an example of a structure of a data segment cache according to embodiments of the present disclosure.

FIG. 4 illustrates an example of a structure of a data segment cache DS_CACHE according to embodiments of the present disclosure.

Referring to FIG. 4, the data segment cache DS_CACHE may be a hash table including N (where N is a natural number equal to or greater than 2) buckets BK, each of which can cache one or more data segments DS. A hash table is a data structure that enables low latency in a search operation and low costs for inserting and deleting operations. A hash table may be referred as a hash or a hash map, etc.

The data segment cache DS_CACHE may be implemented as a hash table so that operations of caching a new data segment or deleting a cached data segment may be performed quickly.

Meanwhile, various data structures may be used to manage the one or more data segments DS cached in each bucket BK. For example, the data segments DS cached in each bucket BK may be managed in a linked list structure.

In the above, it has been described that the data segment cache DS_CACHE may be a hash table.

Hereinafter, a specific operation of caching a data segment in a data segment cache DS_CACHE having a hash table structure will be described.

Figure 5:
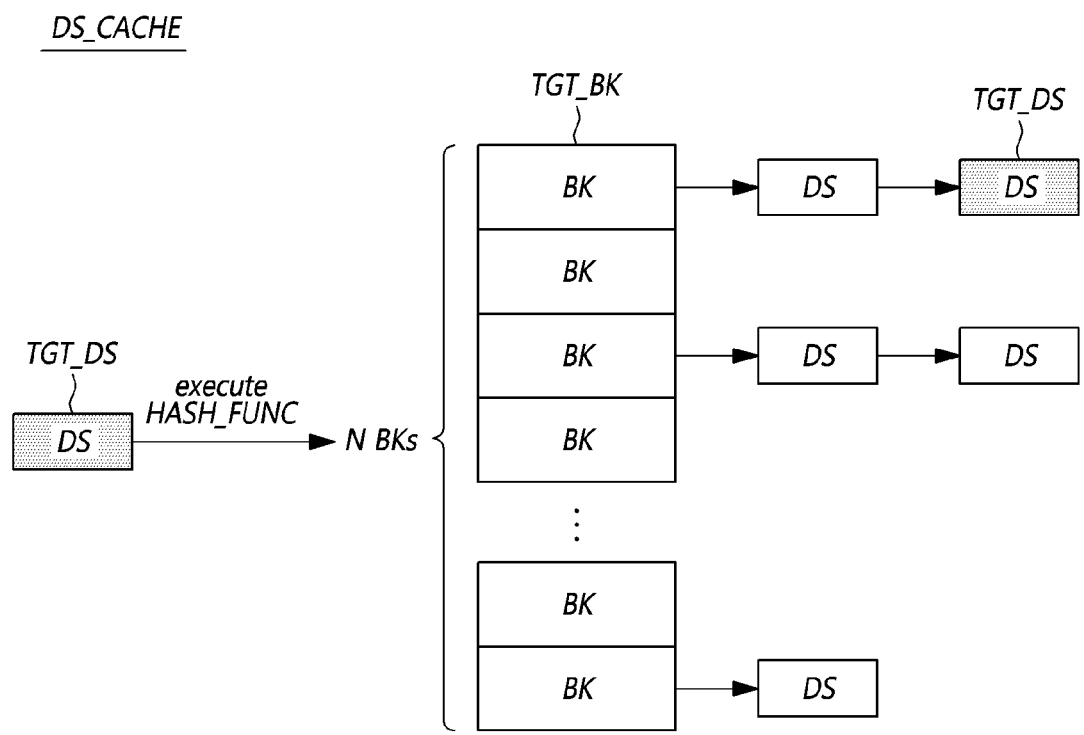
FIG. 5 illustrates an example of an operation of caching a target data segment in a data segment cache by a storage device according to embodiments of the present disclosure.

FIG. 5 illustrates an example of an operation of caching a target data segment TGT_DS in a data segment cache DS_CACHE by a storage device 200 according to embodiments of the present disclosure.

Referring to FIG. 5, the controller 120 of the storage device 100 may execute a hash function HASH_FUNC on the target data segment TGT_DS. The hash function HASH_FUNC is configured to produce a result that may indicate any of the N buckets BK; for example, when the N buckets BK are designated as a first through N-th bucket, the hash function HASH_FUNC produces a result greater than or equal to 1 and less than or equal to N. In embodiments, executing the hash function HASH_FUNC on the target data segment TGT_DS may comprise executing the hash function HASH_FUNC on an index of the target data segment TGT_DS. The index may be an address (logical address or physical address) associated with or included in the target data segment TGT_DS. The index may be another value (e.g. key value) associated with the target data segment TGT_DS.

The controller 120 may determine a target bucket TGT_BK, which is a bucket in which the target data segment TGT_DS is to be cached, among the N buckets BK included in the data segment cache DS_CACHE based on the result of executing the hash function HASH_FUNC.

Subsequently, the controller 120 may cache the target data segment TGT_DS in the target bucket TGT_BK.

While FIG. 5 described an example case in which the target bucket TGT_BK is a first bucket among the N buckets BK, however, the target bucket TGT_BK may be any one of the N buckets BK, according to the result produced by the hash function HASH_FUNC.

Figure 6:
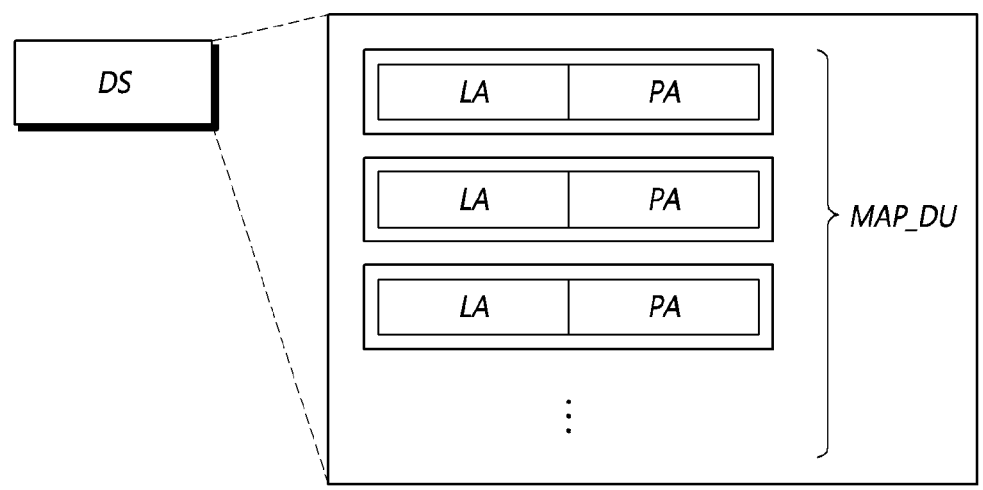
FIG. 6 illustrates an example of a structure of a data segment according to embodiments of the present disclosure.

FIG. 6 illustrates an example of a structure of a data segment DS according to embodiments of the present disclosure.

Referring to FIG. 6, the data segment DS may include one or more mapping data units MAP_DU. Each of the mapping data units MAP_DU may include a logical address LA and a physical address PA which are mapped to each other.

In this case, the data segment DS may be used for translation or conversion between the logical address LA and the physical address PA. For example, when the above-described flash translation layer FTL performs translation on a specific logical address, there may be search for a physical address mapped to the corresponding logical address from the data segment DS. In such an embodiment, the logical address being search for, or a portion thereof, would be used as the input to the hash function HASH_FUNC, and the output of the hash function HASH_FUNC used to select one of the N buckets BK.

Figure 7:
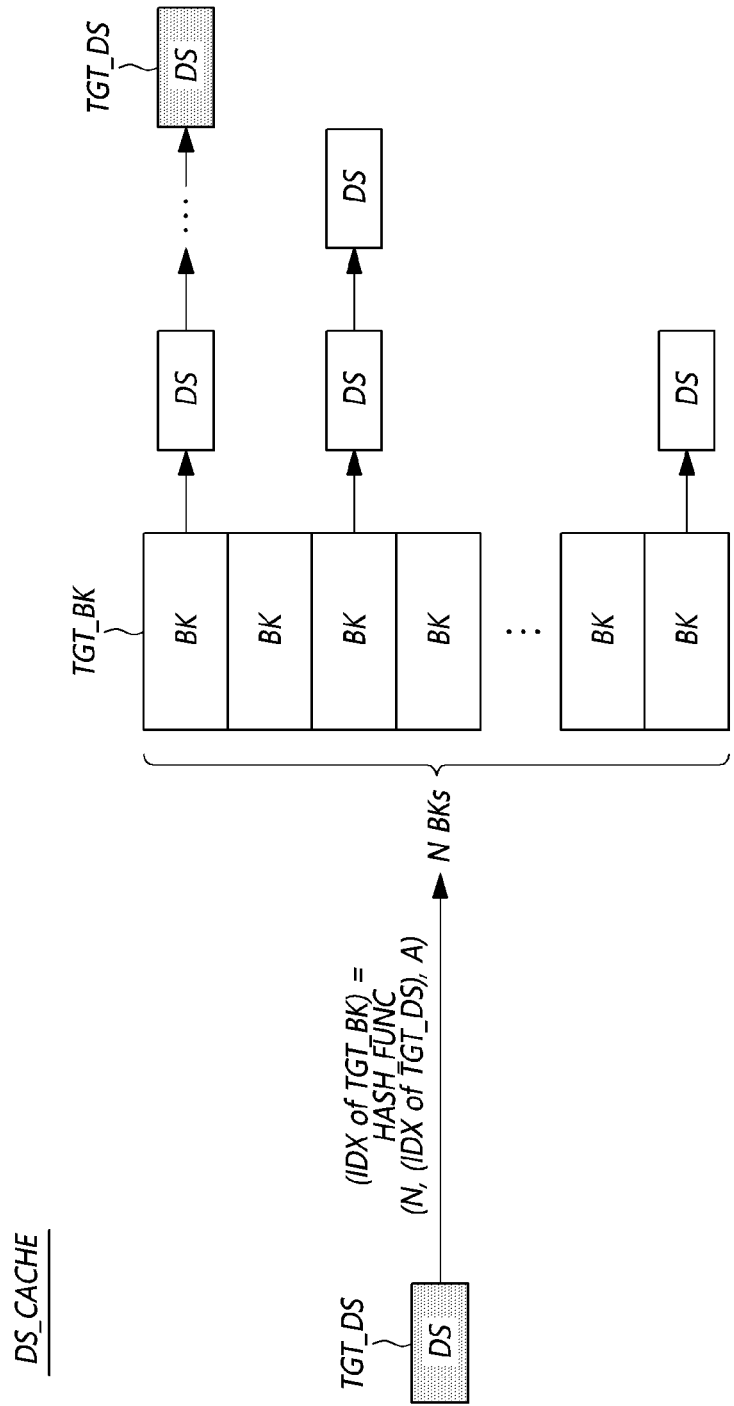
FIG. 7 illustrates an example of an operation of determining a target bucket by a storage device according to embodiments of the present disclosure.

FIG. 7 illustrates an example of an operation of determining a target bucket TGT_BK by a storage device 100 according to embodiments of the present disclosure.

As described above with reference to FIG. 5, the controller 120 of the storage device 100 may execute the hash function HASH_FUNC on an index of the target data segment TGT_DS.

In this case, the hash function HASH_FUNC may be a function which outputs an index of a target bucket TGT_BK in which the target data segment TGT_DS is to be cached based on the number N of buckets BK, an index of the target data segment TGT_DS, and a preset seed value A.

For example, the seed value A may be a value which is randomly changed in the case that a power cycle or power mode of the storage device 100 is changed.

For example, the hash function HASH_FUNC may be a function which executes a modulo operation for calculating the remainder of dividing a result value calculated based on the number N of buckets BK, the index of the target data segment TGT_DS, and the seed value A by N.

For example, the hash function HASH_FUNC f(X) for the index of the target data segment TGT_DS may be determined as in Equation 1 below.

$$f(X) = \mathrm{MOD}(X + (X * A)/N,\ N) \qquad \text{[Equation 1]}$$

wherein X is the index of the target data segment TGT_DS.

Meanwhile, in the case that the controller 120 caches the data segments DS according to the above-described method, there may be a possibility that data segments are intensively cached in a specific bucket among N buckets BK in a specific workload.

In this case, when the controller 120 searches for a data segment cached in a corresponding bucket, because the controller 120 may have to examine every data segments in a target bucket TGT_BK, search performance may deteriorate due to the large number of collisions (that is, data segments DS mapped to the same bucket) in the target bucket TGT_BK.

Figure 8:
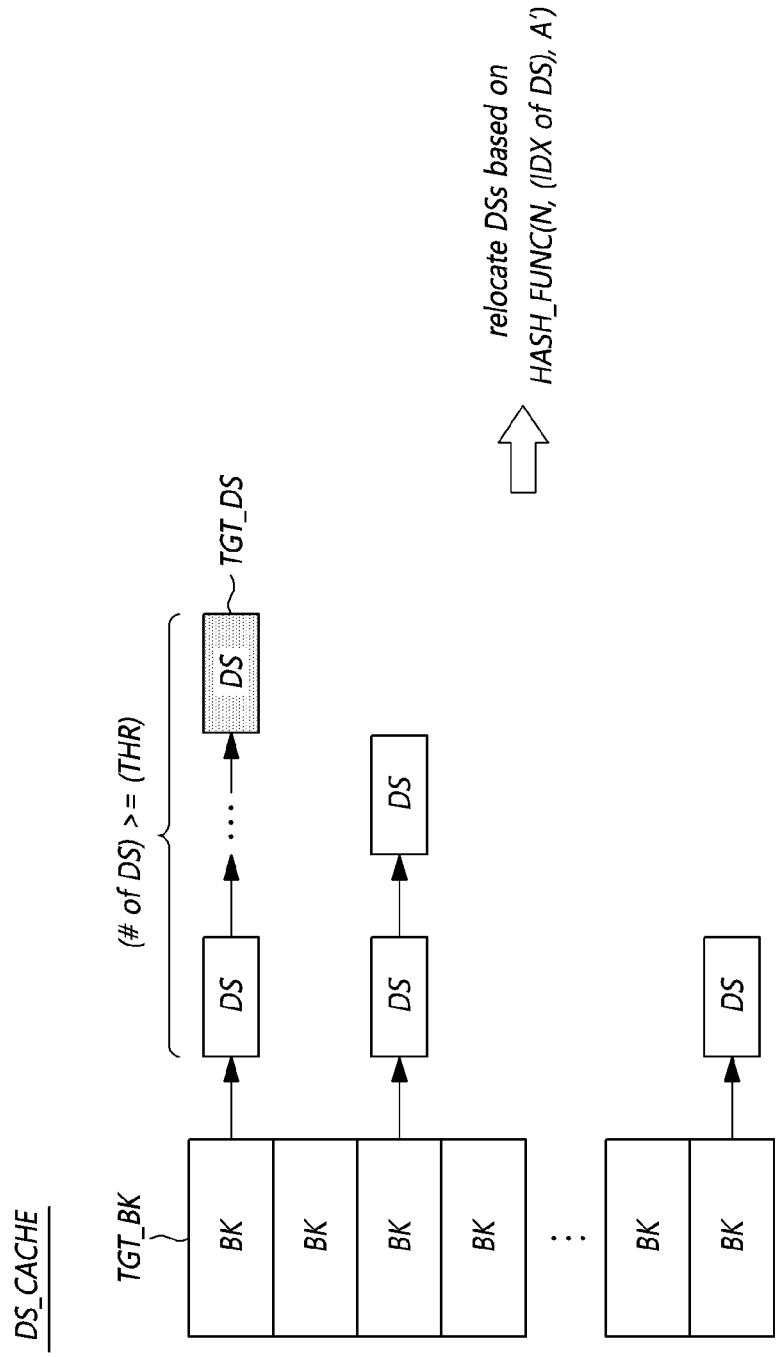
FIGS. 8 to 9 illustrate examples of an operation of relocating data segments cached in a data segment cache by a storage device according to embodiments of the present disclosure.
Figure 9:
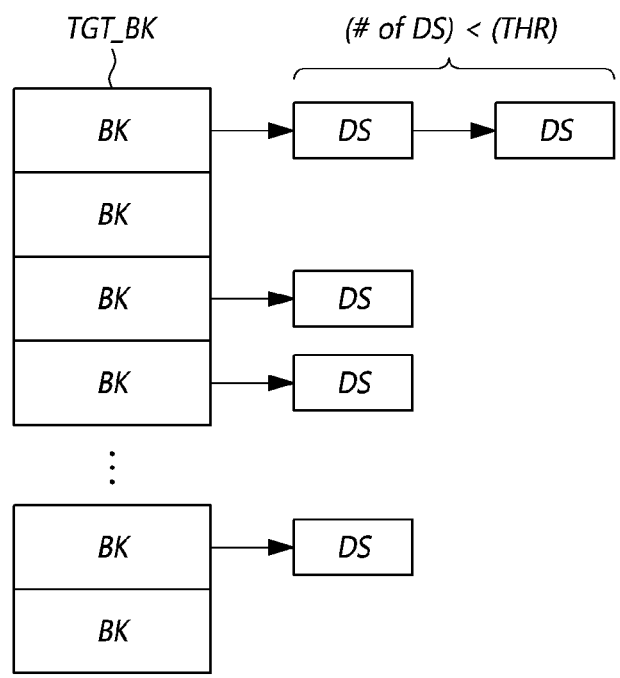

FIGS. 8 to 9 illustrate examples of an operation of relocating data segments DS cached in a data segment cache DS_CACHE by a storage device 100 according to embodiments of the present disclosure.

Referring to FIG. 8, the controller 120 of the storage device 100 may determine whether the number of data segments DS cached in the target bucket TGT_BK is greater than or equal to a set threshold number THR after caching the target data segment TGT_DS in the target bucket TGT_BK.

For example, the indexes of four data segments including the target data segment TGT_DS may be 0, 29, 43, and 57, respectively, the four data segments may be cached in the target bucket TGT_BK, and the set threshold number THR may be 3.

If the number of data segments DS cached in the target bucket TGT_BK is greater than or equal to the threshold number THR, the controller 120 may change the seed value used in the hash function from A to A', and may relocate data segments DS cached in the data segment cache DS_CACHE.

The controller 120 may execute a hash function for each of the data segments DS cached in the data segment cache DS_CACHE in order to relocate the data segments DS cached in the data segment cache DS_CACHE, and may newly determine a bucket for caching each data segment based on the result of executing the hash function.

This relocation of the data segments DS cached in the data segment cache DS_CACHE may be expressed as reconfiguration of the data segment cache DS_CACHE.

In this case, the changed seed value A' may be determined in various ways.

For example, the controller 120 may randomly change the seed value from A to A'. In this case, the changed seed value A' may in some embodiments be a prime number.

As another example, the controller 120 may increase or decrease the seed value A by a specific first value (e.g., 1) to generate A'. Accordingly, in the case that the hash function is a modulo function, the data segments cached in a bucket intensively caching the data segments among N buckets BK may be most efficiently distributed by increasing or decreasing the seed value by the first value according to a characteristic of the modulo function.

Referring to FIG. 9, after relocating the data segments DS cached in the data segment cache DS_CACHE, the number of the data segments cached in each of the buckets BK included in the data segment cache DS_CACHE may be less than or equal to the threshold number THR. Accordingly, it is possible to optimize the time required to search for a specific data segment in the data segment cache DS_CACHE by minimizing the occurrence of collision in the process of searching for a specific data segment in the data segment cache DS_CACHE.

Meanwhile, even after relocating the data segments DS cached in the data segment cache DS_CACHE, the number of data segments cached in some of the buckets BK included in the data segment cache DS_CACHE may be greater than or equal to the threshold number THR. In this case, the controller 120 may again perform an operation of relocating the data segments DS cached in the data segment cache DS_CACHE after changing the seed value again.

Figure 10:
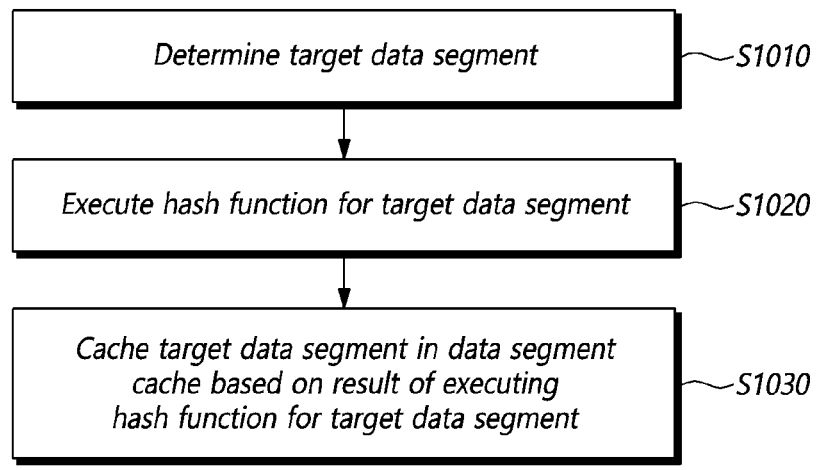
FIG. 10 illustrates an operating method of a storage device according to embodiments of the present disclosure.

FIG. 10 illustrates an operating method of a storage device 100 according to embodiments of the present disclosure.

Referring to FIG. 10, an operating method of a storage device 100 may include determining a target data segment TGT_DS from among a plurality of data segments DS (S1010).

The operating method of a storage device 100 may include executing a hash function HASH_FUNC on the target data segment TGT_DS (S1020). In embodiments, executing the hash function HASH_FUNC on the target data segment TGT_DS may comprise executing the hash function HASH_FUNC on an index of the target data segment TGT_DS.

In addition, the operating method of the storage device 100 may include caching the target data segment TGT_DS in a data segment cache DS_CACHE based on a result of executing the hash function HASH_FUNC on the target data segment TGT_DS (S1030). The data segment cache DS_CACHE may cache all or part of a plurality of data segments DS.

In this case, the data segment cache DS_CACHE may be a hash table including N (N is a natural number equal to or greater than 2) buckets BK each capable of caching one or more data segments DS.

Hereinafter, it will be described a detailed operation of step S1030 in FIG. 11.

Figure 11:
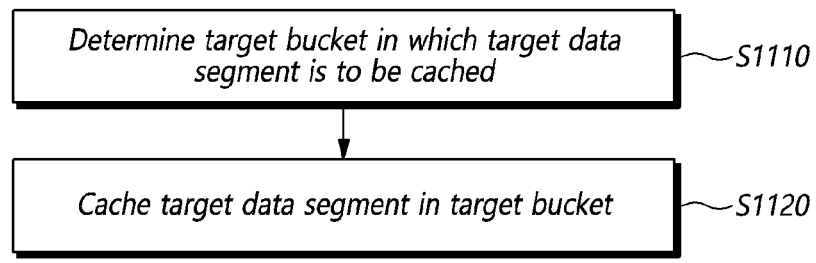
FIG. 11 illustrates an operation method of caching a target data segment in a data segment cache by a storage device according to embodiments of the present disclosure.

FIG. 11 illustrates an operation method of caching a target data segment TGT_DS in a data segment cache DS_CACHE by a storage device 100 according to embodiments of the present disclosure.

Referring to FIG. 11, the step of caching the target data segment TGT_DS in the data segment DS_CACHE may include determining a target bucket TGT_BK, which is a bucket in which the target data segment TGT_DS is to be cached, among the N buckets BK based on the result of executing the hash function HASH_FUNC on the target data segment TGT_DS (S1110).

In this case, the hash function HASH_FUNC may be a function which outputs an index of the target bucket TGT_BK based on N, an index of the target data segment TGT_DS, and a specific seed value.

As an example, the hash function HASH_FUNC may be a modulo function which calculates a remainder after dividing a result value calculated based on the N, the index of the target data segment TGT_DS, and the seed value by N.

In addition, the step of caching the target data segment TGT_DS in the data segment DS_CACHE may include caching the target data segment TGT_DS in the target bucket TGT_BK determined in step S1110 (S1120).

Meanwhile, the operating method of the storage device 100 may further include, if the number of data segments cached in the target bucket TGT_BK is equal to or greater than a threshold number THR after caching the target data segment TGT_DS in the target bucket TGT_BK, changing the seed value and relocating data segments cached in the data segment cache DS_CACHE.

For example, the seed value may be changed to a random value. In this case, the changed seed value may be a prime number.

As another example, the seed value may increase or decrease by a preset first value.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
   a memory for storing a plurality of data segments; and
   a controller configured to control a data segment cache capable of caching all or part of the plurality of data segments,
   wherein the data segment cache is a hash table comprising N buckets each of which is able to cache one or more data segments,
   wherein the controller is configured to determine a target bucket, which is a bucket in which a target data segment is to be cached, among the N buckets based on a result of executing a hash function on the target data segment among the plurality of data segments, and cache the target data segment in the target bucket,
   wherein the hash function is a function which outputs an index of the target bucket based on N, an index of the target data segment, and a seed value, and N is a natural number of 2 or more, and
   wherein the seed value is randomly changed when a power cycle or power mode of the storage device is changed.

2. The storage device of claim 1, wherein each of the plurality of data segments comprises one or more mapping data units,
   wherein each of the mapping data units comprises a logical address and a physical address mapped to each other.

3. The storage device of claim 2, wherein the index of the target data segment corresponds to a logical address.

4. The storage device of claim 1, wherein the hash function is a modulo function which calculates a remainder after dividing a result value calculated based on the N, the index of the target data segment, and the seed value by N.

5. The storage device of claim 4, wherein, if the number of data segments cached in the target bucket is equal to or greater than a threshold number after caching the target data segment in the target bucket, the controller changes the seed value and relocates data segments cached in the data segment cache based on the changed seed value.

6. The storage device of claim 1, wherein changing the seed value comprises randomly changing the seed value.

7. The storage device of claim 6, wherein the changed seed value is a prime number.

8. The storage device of claim 6, wherein changing the seed value comprises increasing or decreasing the seed value by a predetermined value.

9. An operating method of a storage device comprising:
   determining a target data segment from among a plurality of data segments;
   executing a hash function on the target data segment; and
   caching the target data segment in a data segment cache capable of caching all or part of the plurality of data segments based on a result of executing the hash function on the target data segment,
   wherein the data segment cache is a hash table comprising N buckets each of which is able to cache one or more data segments, wherein caching comprises, determining a target bucket, which is a bucket in which the target data segment is to be cached, among the N buckets based on the result of executing the hash function on the target data segment, and caching the target data segment in the target bucket, wherein the hash function is a function which outputs an index of the target bucket based on N, an index of the target data segment, and a seed value, and N is a natural number of 2 or more, and wherein the seed value is randomly changed when a power cycle or power mode of the storage device is changed.

10. The operating method of claim 9, wherein the hash function is a modulo function which calculates a remainder after dividing a result value calculated based on the N, the index of the target data segment, and the seed value by N.

11. The operating method of claim 10, further comprising, if the number of data segments cached in the target bucket is equal to or greater than a threshold number after caching the target data segment in the target bucket, changing the seed value and relocating data segments cached in the data segment cache based on the changed seed value.

12. The operating method of claim 11, wherein changing the seed value comprises changing the seed value to a random value.

13. The operating method of claim 12, wherein the changed seed value is a prime number.

14. The operating method of claim 11, wherein changing the seed value comprises increasing or decreasing the seed value by a predetermined value.

* * * * *